Figure 1:
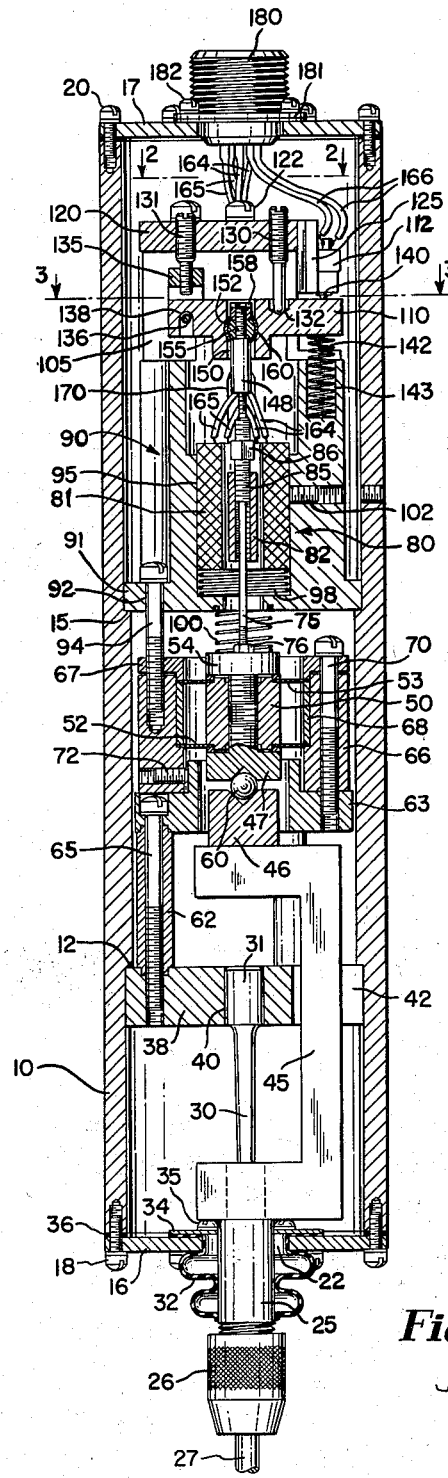

June 25, 1963 W. C. OTIS 3,094,899
SINGLE AXIS TRACER MECHANISM
Filed Aug. 1, 1960

INVENTOR.
WILLIAM C. OTIS
BY Joseph E. Ryan
ATTORNEY

United States Patent Office 3,094,899
Patented June 25, 1963

3,094,899
SINGLE AXIS TRACER MECHANISM
William C. Otis, Richfield, Minn., assignor to Minneapolis-Honeywell Regulator Company, Minneapolis, Minn., a corporation of Delaware
Filed Aug. 1, 1960, Ser. No. 46,395
6 Claims. (Cl. 90—62)

My invention relates to tracer control apparatus and particularly to an improved single axis tracer head.

Apparatus of this type is generally old and with improvements in the machine control industry, a greater need for accuracy in operation, simplicity of construction, and economy in design has arisen. The present invention is directed to an improved single axis tracer head which provides a simplified arrangement of parts to maintain accurate alignment and provide for simplification in design. Apparatus of this type has previously incorporated, in addition to a signal transducer to provide a signal output in accordance with stylus displacement, switching functions to indicate a maximum of deflection of the safety device. Overdeflection of the stylus will normally incorporate a second control to prevent the machine and the work from abnormal tracing conditions. In the present device, a simplified overdeflection and underdeflection control operation or signal is provided through a single switch and a simplified operating mechanism associated with the output transducer to provide a simplified yet accurate arrangement of parts. Therefore, it is an object of this invention to provide an improved single axis tracing assembly and, in addition, in a single axis tracer assembly, a composite overdeflection and underdeflection control mechanism which is accurately adjustable.

It is a further object of this invention to provide a single axis tracer assembly or head which is simple in design, economical to manufacture, and extremely accurate in operation.

Figure 2:
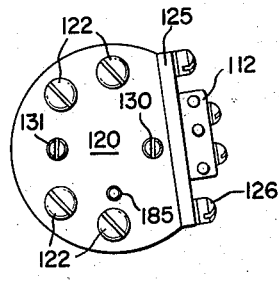
Figure 3:
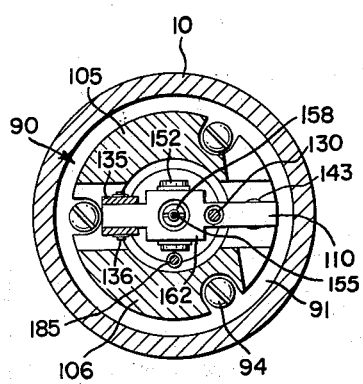

These and other objects of this invention will become apparent from the reading of the attached description together with the drawing wherein:

FIGURE 1 is a cross sectional view of the tracer head;
FIGURE 2 is a sectional view of a portion of the tracer taken along the lines 2—2 in FIGURE 1; and
FIGURE 3 is a second sectional view of the portion of the apparatus taken along the lines 3—3 in FIGURE 1.

My improved single axis tracing assembly or head is housed in a cylindrical casing member indicated generally at 10 in section in FIGURE 1, the casing member including two interior annular shoulders indicated at 12 and 15, respectively, and a pair of end caps 16, 17 which are secured to the extremities of the cylindrical casing member through suitable means such as screws 18, 20, respectively. Extending through an aperture 22 in the end cap 16 of the casing is a stylus shaft 25 having a feeler chuck 26 and stylus 27, a necked down torsion portion 30, and a mounting extremity or hub 31. The stylus shaft is sealed to the end plate member 16 by means of a bellows 32 and a sealing gasket 34 which are secured to the end cap through suitable means such as screws indicated at 35. Further, the end cap 16 is sealed at the extremity of the casing by means of a gasket 36 held in position by screw means 18. The hub of the stylus shaft is mounted in a bulkhead member or support 38 which is positioned within the cylindrical casing and abuts against the shoulder portion 12 therein. Support or bulkhead member 38 has an aperture 40 therein in which is positioned the hub 31 of the stylus shaft and sufficient clearance is provided in the aperture 22 to allow for uniform and universal displacement of the stylus shaft in a plane normal to the extent thereof through the flexible portion 30. The support or bulkhead portion 38 also includes an aperture section 42 through which extends a C-shaped connecting member or bell crank type linkage 45, one extremity of which fits over and is suitably secured to the stylus shaft 25. Connected to the opposite extremity of the bell-shaped or C-shaped connection or linkage is an inverted cone member or yoke 46 which is suitably attached thereto. Cone member or yoke 46 cooperates with a similar cone or yoke member 47. Cone or yoke member 47 is actually a composite structure which includes a support 50 for a pair of aligning springs 52, 53 with an end cap 54 completing the structure for securing the springs at their annular inner periphery. The springs 52, 53 are of a flexible disk type and support the yoke member 47, and are in turn supported on the base structure at their annular outer periphery, as will be later defined, so that a ball member 60 may be positioned in the inverted cone members or yokes 46, 47 to provide a conventional lateral to longitudinal motion transmission mechanism. The springs 52, 53 are supported through a structure which includes a plurality of spacers 62, a second securing member 63 having an aperture therein in which are positioned the translational cone members 46, 47 with these parts being held in assembled relationship to the support member 38 by means of screws, one of which is shown at 65. Similarly, the springs supporting assembly includes an annular spacer member 66 and an end plate 67 which together clamp the outer peripheries of the springs 52, 53 between a spacer member 68 and themselves, these parts being held in assembled relationship by means of a second plurality of screw means indicated at 70. Also included in the assembly is a locating pin 72 which threads through the spacer member 66 and operates to center the collar or support member 63 relative to the inverted yokes or cone members 46, 47. Thus it will be seen that the aligning springs 52, 53 are clamped at their outer periphery by means of the structure 66, 67, 68 held together by the screw means 70, which in turn mounts the spring aligning structure on the annular spacer 63, the spacer 63 in turn being mounted on the spacers 62 and to the bulkhead or support member 38. Connected to and integral with the cone member 47 and its supporting end cap 54 which hold the center of the springs in a predetermined relationship is a rod extension or shaft 75 which is suitably secured to the member 54 by means of a nut 76. Thus with engagement of the stylus 27 in feeler chuck 26, with an object such as a template (not shown), the feeler member will pivot about its flexure section or shaft 30, causing the linkage 45 mounted thereon to be displaced in a translational direction. This translational movement will be imparted to the cone member or yoke 46 and through the ball 60 and will cause a longitudinal movement or axial movement of the member 47 as the ball rides up on the inverted conical surfaces of the yokes 46, 47 to cause the assembly, including the shaft 75, to move in an axial or longitudinal direction. The parts are held in alignment by means of a spring 52, 53 and its supporting structure and the ball is retained between the yoke members through this support. The shaft 75 extends through a linear voltage differential transformer or signalling device, indicated generally at 80 as comprising an annular winding 81 and armature member 82, the armature member being threaded on the shaft at a threaded portion thereof indicated at 85, which has a tool engaging portion 86 for purposes of adjustment. The winding 81 of the signalling device or transformer is mounted in a support structure indicated generally at 90 having a flange section 91 with a plurality of mounting holes therein 92, best seen in FIGURE 3, through which are threaded screw means 94 to secure the spring support structure 67, 66 in assembled relation with the support 90. The flange portion 91 rests against the shoulder portion 15 in the cylindrical casing and the connection of the screw means from the flange through the spring supporting structure 66, 67 draws the parts including the spacer members 62, 63 and the support or bulkhead 38 against the shoulder 12 to accurately position the assembly within the casing. The support 90 is generally irregular in shape, having the centrally located aperture 95 extending therethrough in which the coil 81 is positioned, being positioned by a spring 98 and, as will be later seen, through an adjusting pin mounted in the upper bracket portion of the assembly. Similarly, a spring 100 is positioned between the flange portion 91 of the support and the securing member 54 to further add bias and to the cone members or yoke members 46, 47 to position the ball. The winding 81 is held in position in the aperture in the support by means of a set screw 102 threaded therein. Support member 90 terminates in a pair of upstanding flanges 105, 106, best seen in FIGURE 3, which provide for the positioning of a lever member 110 and the mounting of a control switch 112 thereon.

As will be seen in FIGURE 1, an adjustment mounting plate 120 is suitably secured to the extremities of the upstanding or bracket portions 105, 106 of the support member 90 through screw means indicated at 122. Attached to one side surface of the support portions 105, 106 is a mounting bracket 125 for the switch 112 which in turn is secured through screw means 126 to the portions 105, 106. Extending through the adjustment mounting bracket 120 are two pins 130, 131 which, as will be later noted, provide the adjustment for the pivots of the lever 110. The pin 130, adjusting overdeflection for the switch, engages the lever 110 in a conical recess 132 to provide the first pivot point, while the adjustment pin 131 includes a bracket 135 with a pivot rod 136 integral therewith engaging the undersurface of the lever 110 in a groove 138 therein. The switch 112 is mounted on the plate 125 such that its operating feeler 140 normally engages the lever 110 and such that the switch would be deflected and in one operating condition. Movement of the lever away from the switch button 140 would move the switch to a second operating condition. Positioned on the opposite side of the lever from the switch 112 is a bias spring 142 which fits into a conical recess 143 in a portion of the support and operates to bias the lever against the switch contact. The lever 110 is actually connected to the rod portion 85 or shaft portion 85 mounting the armature 82 of the signalling transducer. Actually, the threaded connection portion extends beyond the coil 81 of the signalling transducer and is threaded to include or mount a connecting member 148, which extends into an aperture 150 in the lever 110. A cylindrical linkage 152 or connector, best seen in FIGURES 1 and 3, connects to an extension 155 of the connecting member 148 and holds the pivotal or cylindrical connecting member within the confines of the lever through a lock nut 158. Bearing surfaces material 160 surround the cylindrical connector or provide a pivotal bearing surface for journaling of the lever as the rod moves back and forth with the extension of the shaft 75 through the connectors 85 and 148. This extension is shown (in FIGURE 3) as included in an enlarged portion of the lever, indicated at 162, so that the bearing material and connector members extend there-through. Thus longitudinal or axial movement of the shaft will impart to the lever movement which will cause the lever to pivot about the pivot pin 130 if the movement is toward end plate 17, or about the pivot pin 136 if movement is toward end plate 16. In either case the extremity of the lever 110 engaging the switch button 140 will pivot away from the switch button, tending to operate the switch 112.

The electrical connections from the coil or field member of the signalling transducer which includes a primary and secondary winding or circuit configuration (not shown) are brought out through the conductors 164, 165, respectively, which indicates the circuit connections from the primary and secondary windings and through an aperture 170 in the support. These conductors extend along the side of the support as shown in FIGURE 1, to an electrical connector member 180 mounted on and positioned in the end cap 17 through a suitable bracket and screw means indicated at 181, 182, respectively. Similarly, the switch circuit is brought out from conductors 166 leading to the connector member 180 in a conventional manner.

From an operational standpoint, it will be noted that the pivot structure for the feeler is merely a flexure rod permitting universal or two-axis displacement of the feeler without having frictional forces applied thereto. Movement of the feeler in any direction in a plane normal to the extent of the feeler will pivot the bell crank or linkage member 45 to apply the translational movement to the ball cone motion translational members 46, 47 and 60 to produce axial or longitudinal movement in the rod 75. The alignment mechanism in the form of the circular disk type springs maintains the ball cone translational members in the aligned and assembled relationship and the movement of the rod will displace the armature 82 or core of the signalling device or differential transformer to produce an output signal in accordance with the departure of the core from a predetermined or neutral position. The field member 81 which includes the primary and secondary windings is adjustably positioned in the support 90 by means of a pin 185 which is threaded in the adjustment cap 120 and extends to one side of the lever 110 to engage the surface (not shown) of the field or coil assembly 81 to adjustably position the same relative to the spring 98 such that it can be locked in a predetermined position with respect to the core by means of a locking member 102. Thus the field element is shiftable relative to the core for adjustment purposes and to establish a null output or predetermined signal output for a reference position of the stylus. In addition, the movement of the shaft with the armature or core 82 thereon is transmitted to the lever 120 through the ball connection assembly 152, 155, 158 to pivot the lever about one or the other of the pivot members 130, 136 in their respective pivot seats 132, 138 to cause the extremity of the lever 110 to disengage the button 140 of the switch 112 to operate the switch and provide a signal indicating either overdeflection or underdeflection of the stylus 26. The members or pins 130, 131 are adjustable, as seen in FIGURE 2, to locate the pivot points so that the lever will pivot upon a predetermined movement of the shaft 75 to operate the switch. It will be further noted that the over-all deflection adjustment is located nearest the switch and on the top surface of the lever such that displacement of the core over a wider range of movement is required to operate the switch upon overdeflection than upon underdeflection which is controlled by the pivot points 136, 138 and adjusted by means of the screw 131. It will also be noted that a single lever and switch are required to provide both overdeflection and underdeflection control to an associated apparatus (not shown) to be operated by the single axis tracer mechanism. While I have suggested a differential transformer as a signal inducing transducer for the stylus, it may be recognized that other types of signalling device may be incorporated herein.

In considering this invention it should be remembered that the present disclosure is intended to be illustrative only and the scope of the invention should be determined only by the appended claims.

I claim as my invention:

1. In a single axis tracer, casing means, support means in said casing means, flexible rod means positioned in said support means and extending beyond said casing, a feeler connected to the end of said flexible rod, linkage means connected to said rod means and extending through an aperture in said support means connected at one extremity to said rod means and extending along its other extremity through said support means, an inverted cone member connected to the free extremity of said linkage, a second inverted cone member, ball means positioned between said inverted cone members and adapted to cooperate with said cone members to transmit sidewise movement to longitudinal movement, a pair of disc type spring suspension means connected to said casing and mounting said second cone member for centering and positioning said second cone member relative to said ball means, a rod attached to said second cone member, a multi-part signalling means said rod mounting one of said parts of said signalling means and extending through another of said parts, lever means, switch means mounted on said casing and adapted to cooperate with the extremity of said lever means for operation thereby, a first adjustable pivot means mounted on said casing and contacting said lever on one surface, a second adjustable pivot means mounted on said casing and contacting said lever on the opposite surface, connection means mounted on said rod and connected to said lever intermediate said pivots, said pivots being so positioned that predetermined movement of said rod from a predetermined position in either direction along the axis of said rod will pivot said lever selectively about said pivots away from said switch to operate said switch, and biasing means urging said lever towards the switch.

2. In a single axis tracer, casing means, support means in said casing means, flexible rod means positioned in said support means and extending beyond said casing, a feeler connected to the end of said flexible rod means, a linkage connected to said flexible rod means and extending through an aperture in said support means connected at one extremity to said flexible rod means and extending its other extremity through said support means, motion transmitting means for transmitting sidewise movement to longitudinal movement connected to said linkage, alignment means connected to said casing and mounting in part said motion transmitting means for centering and positioning the same, a shaft attached to said motion transmitting means, a control means, said shaft connected to said control means for operating the same and extending beyond said control means, lever means, switch means mounted on said casing and adapted to cooperate with the extremity of said lever means for operation thereby, a first adjustable pivot means mounted on said casing and contacting said lever on one surface, a second adjustable pivot means mounted on said casing and contacting said lever on the opposite surface, connection means mounted on said shaft and connected to said lever intermediate said pivots, said pivots being so positioned that movement of said shaft from a predetermined position in either direction along the axis of said shaft will pivot said lever selectively about said pivots away from said switch to operate said switch, and biasing means urging said lever towards the switch.

3. In a single axis tracer, casing means, support means in said casing means, flexible rod means positioned in said support means and extending beyond said casing, a feeler connected to the end of said flexible rod means, motion transmitting means for transmitting sidewise movement of said flexible rod means to longitudinal movement connected to said flexible rod means, alignment means connected to said casing and mounting in part said motion transmitting means for centering and positioning the same, a shaft attached to said motion transmitting means, a control means, said shaft connected to said control means for operating the same and extending beyond said control means, lever means, switch means mounted on said casing and adapted to cooperate with the extremity of said lever means for operation thereby, a first adjustable pivot means mounted on said casing and contacting said lever on one surface, a second adjustable pivot means mounted on said casing and contacting said lever on the opposite surface, connection means mounted on said shaft and connected to said lever intermediate said pivots, said pivots being so positioned that movement of said shaft from a predetermined position in either direction along the axis of said shaft will pivot said lever selectively about said pivots away from said switch to operate said switch, and biasing means urging said lever towards the switch.

4. In a single axis tracer, casing means, support means in said casing means, flexible rod means positioned in said support means and extending beyond said casing, a feeler connected to the end of said flexible rod means, motion transmitting means for transmitting sidewise movement of said flexible rod means to longitudinal movement connected to said flexible rod means, a shaft attached to said motion transmitting means, a control means, said shaft connected to said control means for operating the same and extending beyond said control means, lever means, switch means mounted on said casing and adapted to cooperate with the extremity of said lever means for operation thereby, a first adjustable pivot means mounted on said casing and contacting said lever on one surface, a second adjustable pivot means mounted on said casing and contacting said lever on the opposite surface, connection means mounted on said shaft and connected to said lever intermediate said pivots, said pivots being so positioned that movement of said shaft from a position in either predetermined direction along the axis of said shaft will pivot said lever selectively about said pivots away from said switch to operate said switch, and biasing means urging said lever towards the switch.

5. In a tracer control, casing means, a feeler mounted in said casing and adapted to be displaced from a normal position, means connected to said feeler and movable longitudinally along the axis of the said casing in response to movement of said feeler, control means including a pair of relatively movable parts, a first of said parts being mounted on said casing and the other being connected to said last named means for operation thereby to produce a signal output from said control means in proportion to displacement of said feeler from said predetermined position, lever means, switch means mounted on said casing and adapted to cooperate with the extremity of said lever means for operation thereby, a pair of adjustable pivot means mounted on said casing and adapted to cooperate with said lever means, means connecting said last named means to said lever means to impart said longitudinal movement of said last named means to said lever means such that said lever means will be pivoted selectively about said pivot means with movement of said last named means in opposite directions along the axis of said casing to pivot said lever means relative to said switch to operate said switch.

6. In a tracer control, casing means, a feeler mounted in said casing and adapted to be displaced from a normal position, means connected to said feeler and movable longitudinally along the axis of the said casing in response to movement of said feeler, control means including a pair of relatively movable parts, a first of said parts being mounted on said casing and the other being connected to said last named means for operation thereby to produce a signal output from said control means in proportion to displacement of said feeler from said predetermined position, lever means, switch means mounted on said casing and adapted to cooperate with the extremity of said lever means for operation thereby, first adjustable pivot means mounted on said casing and contacting said lever on one surface, second adjustable pivot means mounted on said casing and contacting said lever on the opposite surface, said last named means being connected in addition to said lever means to impart said longitudinal movement to said lever means, said first and second pivot means being so positioned with respect to said lever means that movement of said last named means with movement of said feeler from said predetermined position in either direction along the axial extent of said casing will pivot said lever means selectively about said first and second adjustable pivot means away from said switch to operate said switch, and biasing means urging said lever means toward said switch.

References Cited in the file of this patent

UNITED STATES PATENTS

| | | |
|---|---|---|
| 2,334,956 | Ridgway | Nov. 23, 1943 |
| 2,395,525 | Wilkie et al. | Feb. 26, 1946 |
| 2,868,092 | Foncannon et al. | Jan. 13, 1959 |
| 2,937,577 | Morgan | May 24, 1960 |